United States Patent
Bell et al.

(10) Patent No.: US 9,971,683 B1
(45) Date of Patent: May 15, 2018

(54) AUTOMATIC COMPUTER MEMORY MANAGEMENT COORDINATION ACROSS A GROUP OF SERVERS

(71) Applicant: Sprint Communications Company L.P., Overland Park, KS (US)

(72) Inventors: Timothy L. Bell, Shawnee, KS (US); Wayne W. Schroeder, Independence, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 236 days.

(21) Appl. No.: 14/518,523

(22) Filed: Oct. 20, 2014

(51) Int. Cl.
*G06F 15/173* (2006.01)
*G06F 12/02* (2006.01)
*H04L 29/08* (2006.01)

(52) U.S. Cl.
CPC ...... *G06F 12/0253* (2013.01); *H04L 67/1095* (2013.01); *H04L 67/16* (2013.01); *G06F 2212/1044* (2013.01); *G06F 2212/154* (2013.01)

(58) Field of Classification Search
CPC .... G06F 12/0253; G06F 12/0269; G06F 9/50; G06F 9/5083; G06F 9/45504; G06F 17/30348; G06F 17/30067; H04L 67/1008; H04L 67/16; H04L 67/1095
USPC ......................................................... 711/167
See application file for complete search history.

(56) References Cited

U.S. PATENT DOCUMENTS

| | | | | |
|---|---|---|---|---|
| 6,247,027 B1* | 6/2001 | Chaudhry | ........... | G06F 12/0253 |
| 6,611,858 B1* | 8/2003 | Aravamudan | ...... | G06F 12/0269 707/999.1 |
| 6,711,606 B1* | 3/2004 | Leymann | ......... | G06F 17/30067 707/E17.01 |
| 8,234,378 B2* | 7/2012 | Stephens | ............ | H04L 67/1008 709/205 |
| 8,499,010 B2* | 7/2013 | Gracie | ................ | G06F 12/0261 707/813 |
| 8,566,826 B2* | 10/2013 | Garmark | ............ | G06F 12/0253 718/1 |
| 8,892,610 B1* | 11/2014 | Pang | ................... | G06F 12/0253 707/813 |
| 9,037,703 B1* | 5/2015 | Wu | .......................... | G06F 9/50 370/252 |
| 2006/0101314 A1* | 5/2006 | Husbands | ........... | G06F 12/0253 714/100 |

(Continued)

*Primary Examiner* — Dustin Nguyen

(57) ABSTRACT

A method of automatic memory management on a group of servers, the group of servers operably coupled to a coordinating program. The method comprises a first server of the group of servers performing garbage collection, the coordinating program performing an analysis on the group of servers, and, based on the analysis, the coordinating program determining a feasibility of having a second server performing garbage collection during a time when the first server is performing garbage collection without degrading a service provided by the group of servers. The method further comprises, responsive to the coordinating program determining that the second server can perform garbage collection during the time that the first server is performing garbage collection without degrading the service provided by the group of servers, the coordinating program commanding the second server to perform garbage collection when the first server is also performing garbage collection.

20 Claims, 3 Drawing Sheets

(56) References Cited

U.S. PATENT DOCUMENTS

| | | | |
|---|---|---|---|
| 2006/0143595 A1* | 6/2006 | Dostert | G06F 9/45504 |
| | | | 717/127 |
| 2006/0209695 A1* | 9/2006 | Archer, Jr. | G06F 9/50 |
| | | | 370/235 |
| 2007/0260654 A1* | 11/2007 | Creamer | H04L 67/1008 |
| 2008/0059747 A1* | 3/2008 | Burckart | G06F 12/0253 |
| | | | 711/167 |
| 2010/0262568 A1* | 10/2010 | Schwaighofer | G06N 99/005 |
| | | | 706/12 |
| 2010/0274885 A1* | 10/2010 | Yoo | H04L 67/1008 |
| | | | 709/224 |
| 2011/0072427 A1 | 3/2011 | Garmark | |
| 2012/0036309 A1* | 2/2012 | Dillow | G06F 11/108 |
| | | | 711/103 |
| 2012/0137006 A1* | 5/2012 | Minato | G06F 9/5083 |
| | | | 709/226 |
| 2012/0323979 A1* | 12/2012 | Basu | G06F 12/0269 |
| | | | 707/813 |
| 2014/0289286 A1* | 9/2014 | Gusak | G06F 17/30348 |
| | | | 707/813 |
| 2016/0070593 A1* | 3/2016 | Harris | G06F 9/4843 |
| | | | 718/106 |

* cited by examiner

AUTOMATIC COMPUTER MEMORY MANAGEMENT COORDINATION ACROSS A GROUP OF SERVERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer programs or applications may be granted usage of memory from a memory heap during execution. As an application discontinues its use of such dynamic memory, the application may be expected to return the disused dynamic memory to the memory heap so this memory can be used to satisfy future requests by the application for dynamic memory. Typically an application is allocated a predefined amount of heap memory, and if the application exhausts its allocated heap memory, the application may crash with possibly undesirable consequences.

SUMMARY

In an embodiment, a method of managing garbage collection on a group of servers is disclosed, the group of servers operably coupled to a coordinating program, the method comprising a first server of the group of servers performing garbage collection, the coordinating program performing an analysis, the coordinating program determining the acceptability of having a second server performing garbage collection during a time when the first server is performing garbage collection, the coordinating program deciding that the second server may perform garbage collection during a time when the first server is also performing garbage collection, and, the second server then performing garbage collection at a time when the first server is also performing garbage collection.

In another embodiment, a method is disclosed of automatically deciding when to perform a memory management operation on a server, the server one of a group of servers, the group of servers operably coupled to a coordinating program, a trigger point program running on either each of the servers or as part of the coordinating program, the method comprising, the trigger point coordinating program periodically checking the server to see if the first trigger point has been reached, when the first trigger point is reached, the coordinating program deciding whether to have the server perform garbage collection at that time, and, responsive to the coordinating program deciding not to have the server perform garbage collection at that time, the trigger point program periodically checking the server to see if a second trigger point has been reached.

In another embodiment, a method of automatic memory management on a group of servers, the group of servers operably coupled to a coordinating program, the coordinating program deciding when each of the servers in the group of servers will perform a memory management operation, the method comprising, the coordinating program tracking the results of using a first trigger point on each server, and, the coordinating program altering the first trigger point on each server to manage use of the servers in the group of servers, wherein a trigger point is at least one of a predefined threshold of garbage accumulation and a predefined period of time.

In yet another embodiment, a method of automatic memory management on a group of servers, the group of servers operably coupled to a coordinating program is disclosed. The method comprises a first server of the group of servers performing garbage collection and the coordinating program performing an analysis on the group of servers. The method further comprises, based on the analysis, the coordinating program determining a feasibility of having a second server performing garbage collection during a time when the first server is performing garbage collection without degrading a service provided by the group of servers. The method further comprises, responsive to the coordinating program determining that the second server can perform garbage collection during the time that the first server is performing garbage collection without degrading the service provided by the group of servers, the coordinating program commanding the second server to perform garbage collection when the first server is also performing garbage collection.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
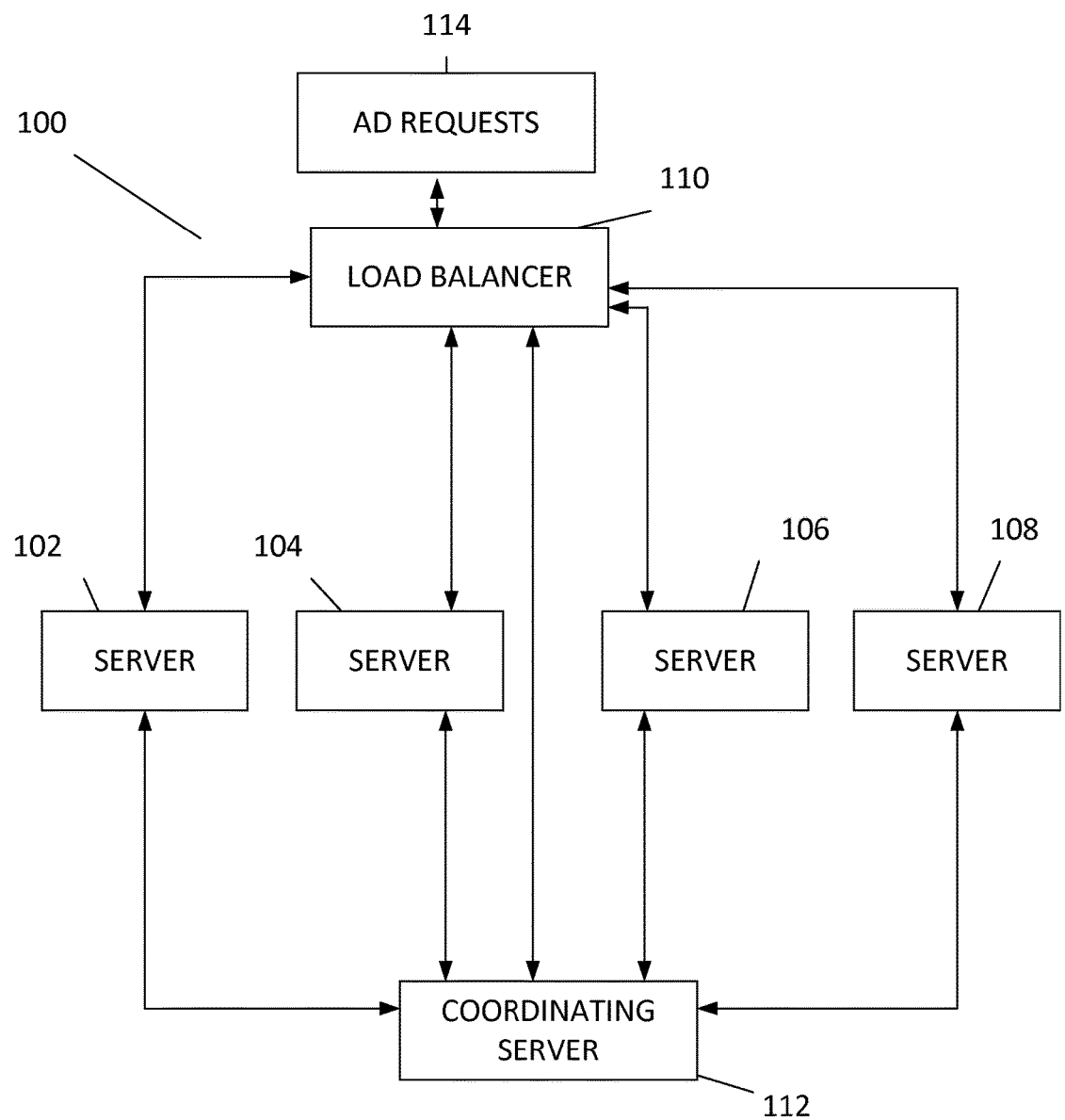
FIG. 1 is an illustration of an apparatus according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Operating complex computer systems entails many challenges. Tuning memory management in computer systems to achieve efficient system operation while also providing high satisfaction to users is such a challenge. An easy solution may be to provide a super abundance of computing resources—more computer hosts or servers and/or more memory—but such an easy solution may have the disadvantage of tying up large amounts of capital investment unnecessarily. The challenge lies in meeting both constraints at the same time: achieving high user satisfaction and efficient operation.

The present disclosure teaches a memory management system and method to provide improved recovery of disused dynamic memory in a computer. When computer applications and/or processes execute, the operating system on the computer may allocate a fixed amount of dynamic memory (e.g., "heap" memory) to the application for use during its processing. The amount of dynamic memory that is allocated to an application can be set somewhat arbitrarily as a configuration parameter, for example by a computer system administrator, but once the application is initiated the allocation of dynamic memory, no matter how large, may be fixed. It is expected that as the application requests and uses dynamic memory, the application will return dynamic memory that is no longer needed to heap memory (e.g., "de-allocate" the dynamic memory). If the application loses track of disused dynamic memory and does not execute functions or system calls to release the disused memory back to heap memory (i.e., a "memory leak"), the dynamic memory can be exhausted. If the application exhausts its fixed allocation of dynamic memory and then requests a dynamic memory location, the operating system may terminate the application: the application may crash, possibly leading to undesirable results (e.g., lost in-progress transactions, corrupted data, unavailability for continued processing).

In some programming languages, the coder or programmer is responsible for including instructions in the program he or she crafts to release dynamic memory when it is no longer needed by the program. Naturally, programmers being fallible human beings, sometimes the dynamic memory is not de-allocated, memory leaks occur, and applications mysteriously crash. Even when a memory leak is suspected to cause such crashes, it can be very difficult to find the source of the memory leak. The Java programming language and operating environment uses a new approach to the memory leak problem. The Java operating environment itself (the "virtual machine" in which Java programs execute) tracks dynamically allocated memory and automatically grooms allocated memory, returning what it deems as disused memory back to the heap, thereby relieving the programmer of this responsibility and also reducing the occurrence of memory leaks. This Java operation is referred to as "garbage collection" in the Java literature and in the Java programming community.

Generally, when Java garbage collection is performed by the Java virtual machine, the applications or processes that normally execute in that Java virtual machine are paused until garbage collection is completed. This process may take a significant amount of time, for example about 2 seconds, about 5 seconds, about 10 seconds or some other time duration. That may seem like a trivial amount of time, but it happens that this duration of processing suspension can unacceptably degrade the performance of some applications. For example, real time processing applications may be unacceptably degraded by such lengthy garbage collection cycles.

As an example, mobile communication devices and desk top computers may be used to browse web sites. When a new web page is accessed, sometimes an advertisement may be requested by the web browser to be displayed adjacent to the web page content, for example at the top of the displayed web page or along the side of the displayed web page. To avoid creating negative impressions in users, the advertisements need to be requested, accessed, transmitted, and displayed quickly. For example, it may be desired that such an ad be requested and displayed within about 1 second, within about 2 seconds, within about 5 seconds, or some other relatively short period of time. If garbage collection occurs on an ad server computer, many ads may be delivered untimely to user devices and create negative user impressions. The present disclosure teaches a system and method that improves garbage collection practices by coordinating garbage collection among a plurality of server computers processing service requests. While the following disclosure focuses on processing ad requests, it is understood that the memory garbage collection methods and systems taught herein can be applied to a large variety of use cases, for example to other service request fulfillment applications executing on a plurality of computer systems.

On occasion, a new service will generate a large number of ad requests back to a computer or application server. These ad requests may come automatically from other computers or from mobile communication devices based on actions of a user. The volume of requests may vary significantly over time. For example, perhaps the busiest time may be one hundred times busier than the slowest time. A group of servers may be provided to handle the ad requests. The group of servers could contain any number of servers, for example four or ten or 100. The provider may tend towards having just enough servers in the group to handle the expected occasional peak load of requests.

To spread the workload evenly over all the various ad request servers, the provider may use a load balancer. The load balancer keeps track of how busy each server is, and feeds requests to the servers in such a way as to try to keep the load of requests fairly even between the various servers. The load balancer, however, may be unaware of when garbage collection takes place on the servers it manages. Hence, it may make poor decisions about how to best distribute new processing requests, for example assigning a load to a server that is currently experiencing garbage collection can defeat the intended result of load balancing—namely high availability and optimal servicing of a workload.

To avoid having the load balancer send requests to an unavailable ad request server, each server may send a first notification to the load balancer when it is going to be unavailable because of garbage collection. Based on that first notification, the load balancer will stop sending requests to that particular server. Once the garbage collection is complete and the server is ready to resume receiving ad requests, the server may send the load balancer a second notification that it is again ready for requests. Upon receiving the second notification, the load balancer will again begin sending requests to that server.

Garbage collection is a common part of programming in the operating systems used in these types of servers. In the operating systems, garbage collection is typically tied by the operating system to a set trigger point, such as 90% of the allocated memory being full. Picking this trigger point, the point at which the server will become unavailable while garbage collection is run, is tunable in the software. That is, one can set the trigger point at whatever number one wants, such as 50% full, 10% full, or perhaps on some time basis, such as once a minute, or once a day. While such programming hopefully prevents an individual server from having the allocated memory overfilling, there still may be times when it is undesirable for that particular server to become unavailable. For instance, when there is a high load rate of ad requests, and all the servers are operating at 90% of capacity to keep up, and another server is already in the midst of garbage collection, or otherwise unavailable, shutting down this particular server may cause the load balancer to not have enough servers to handle all the ad requests flowing at that particular time. Even though the time required to complete the garbage collection may be very short, for example, 50 msec, requests may be coming in at rate such that a large number of requests may be unaddressed during this time period. Or, if the volume of requests is somewhat high, for example at 70% of capacity, having a sizable percentage of the servers unavailable at the same time could be a problem, again causing overload of the system. And while a server can be unavailable for garbage collection, servers can also be unavailable for other reasons, such as internal failures.

The traditional solution to the concern of having allocated memory overfill with garbage was to simply have very short intervals between garbage collections times on each server, without regard to the load rate of ad requests. This action becomes its own problem, as now with the servers going unavailable so often, you increase the risk of a server going unavailable during a high load rate of ad requests. This may lead to purchasing additional servers, which is expensive and inefficient.

To overcome this challenge, a coordinating program may control deciding when the various servers in the group of servers are to garbage collect. The coordinating program may preferably be housed in its own server, or it may be part of the load balancer. The coordinating program could be operably coupled to preferably all the servers in the group of servers. The coordinating program may make an analysis of various parameters to decide when to have each server collect garbage. The coordinating program may look at such parameters as the current load of ad requests, how many servers are already unavailable, percentage of allocated memory that is already filled with garbage, and expected variations in load while the server is unavailable based on, for example, historical usage data. Estimated projected load may be information provided from an outside source, such as a program that has been created to track the flow of requests over time, to determine when high load and low load periods exist. Or, the estimated projected load may be a continuously or periodically updated intelligent model, which for example could preferably be stored with the coordinating program.

Once the coordinating program decides to have a particular server start garbage collection, the coordinating program may notify the load balancer. In an alternative, the coordinating program may simply tell the ad request server to inform the load balancer that it is temporarily unavailable, and the load balancer will proceed to shunt incoming ad requests to other servers.

The coordinating program does not start the decision making process until a first trigger point has been reached. A separate trigger point program may be running on each server individually, or a trigger point program may be a sub-program in the coordinating program. The trigger point program may have a first trigger point for garbage collection based on how much garbage a server has in its allocated memory. For instance, the first trigger point could be 50% of the total memory available for dynamic allocation in a particular server. Or the first trigger point could be based on a set interval of time, such as once a day.

In a preferred embodiment, if at the set time or percentage of allocated memory consumed, it is not an opportune time to have the server garbage collect (for example, the remaining available servers will not be able to handle the load rate of ad requests), the trigger point program will then begin looking for a second trigger point. For example, every additional 5% of garbage, or every two minutes. Once garbage collection has been completed on a server, the trigger point program would then revert back to looking for the first trigger point before attempting to garbage collect on that particular server. In an embodiment, a hybrid triggering rule may be employed that takes both accumulation of disused dynamic memory (e.g., uncollected 'garbage') as a percentage of heap memory available to the subject application and a set interval of time. For example, if garbage collection has not been performed before the set interval of time, garbage collection is triggered by expiration of the set period of time, but if disused dynamic memory accumulates to the predefined threshold of garbage accumulation, garbage collection is triggered even though the set period of time has not expired.

Using this method and apparatus, all the ad request servers in the group will be able to find time to perform garbage collection, without creating a situation where incoming ad requests will get lost or unaddressed. Further, by using an intelligent decision-making system to control the timing of the various servers collecting garbage, longer time gaps between garbage collection events can be utilized. And the risk of having a server go unavailable at a bad time is minimized or even eliminated.

Additionally, in a preferred embodiment, the coordinating program may be able to have multiple servers garbage collect at the same time. For instance, if a first server is already garbage collecting, and a second server reaches its first trigger point, the coordinating program can analyze the situation to determine if the remaining servers will be able to handle the load rate with both the first and second servers unavailable. Indeed, any number of servers could be engaged in garbage collection at the same time, as long as there are enough servers available to handle the current load rate of the ad requests. It is understood that at different times (e.g., when current load rates may be different), different numbers of servers may be needed to bear the ad request load and hence different numbers of servers may be able to undergo garbage collection concurrently.

In a preferred embodiment, the first and second trigger points could be optimizable. That is, the coordinating program could periodically assess itself, and the first and second trigger points, to see if it is managing the servers in an optimal way. It may be that the preferred goal of the assessment is to have the servers unavailable fewer times per time period, while still avoiding getting caught in a situation where the allocated memory is getting almost full, but the server must still take ad requests due to a high load rate.

Referring now to FIG. 1, a schematic diagram of a system 100 is shown. Ad requests 114 come into the load balancer 110. The load balancer then distributes the ad requests in a somewhat balanced fashion to the ad request servers 102, 104, 106 and 108. While shown here with four servers, any plurality of servers could be operably coupled to the load balancer 110, for example, ten or one hundred servers.

Typically the ad request servers 102, 104, 106 and 108 will process the requests and send back the responses to the load balancer 110, and from there back to the source of the ad requests 114. Alternatively, the responses back to 114 could go by an alternate route.

As the ad request servers 102, 104, 106 and 108 process requests, they will begin to accumulate garbage in their allocated memory. A trigger point program is used to help decide when to attempt to have each server collect garbage. A trigger point program may be resident on each server, or alternatively it may reside as part of a coordinating program residing on a coordinating server 112. In an alternative embodiment, the coordinating program could be elsewhere, such as part of the load balancer 110. The decision will initially be based on a primary trigger point, such as a length of time since the last garbage collection for each server, such as for example one day. Or preferably the primary trigger point could be based on a percentage of the allocated memory of each server that is already filled with garbage. For example, once the allocated memory of server 102 reaches 50% full of garbage, the trigger point program is triggered to attempt to have server 102 garbage collect. If the trigger point program is resident on each server, the server will notify the coordinating program that it wants to garbage collect. If the trigger point program is part of the coordinating program, the coordinating program will need to track all the various servers, or at least have an ability to estimate for each server, to determine how much of the allocated memory in each server has been consumed by garbage. At some point each of the servers 102, 104, 106 and 108 will have a trigger point reach and the coordinating program will consider whether to attempt to have each server garbage collect at that time.

Before having any particular server garbage collect, the coordinating program will proceed to run an analysis to see if this is a good time or a suitable time (e.g., garbage collecting at this time would not unduly interfere with on going processing) to have that particular server garbage collect. The analysis will primarily be to consider whether the remaining available servers can handle the load rate of the ad requests. So for example, if the four servers are all running at 80% of capacity, it would not be a good time to allow the requesting server to go unavailable, as the remaining servers would not be able to cover the total load rate of ad requests. To determine the percentage of running capacity of each server, the coordinating program does not necessarily have to look at an actual measure of each server. If the load balancer is doing its job well, each of the servers will have very similar loads. Hence, the coordinating program may just look at one server to determine what it is trying to determine.

The analysis by the coordinating program may also look at how many other servers are already unavailable. So for instance, if two of the four servers 102, 104, 106 and 108 are already unavailable, and the two remaining servers are now running at 60% of capacity, it would not be a good time to allow a third server garbage collect. However, if the load rate is such that the remaining available servers can handle all of it, the coordinating program can allow more than one server to become unavailable at a time.

The coordinating program may look at other data as well. For instance, the coordinating program may consider projected estimates of upcoming ad request volumes. The estimates may be based on historical usage data, looking at how the volume of ad requests has varied through different times of day, or different days of the week. These estimates could be updated periodically as well. These estimates could also be based on a periodically or continuously updated intelligent model attempting to predict future volume of ad requests. The estimates could be provided to the coordinating program from some outside source, or the model could run as a sub-program on the coordinating program, or on the program server 112. Other potentially relevant inputs could be included as well.

Once the coordinating program has made its analysis, it then makes a decision based on the analysis. The decision will be to either proceed with garbage collection, or not. If the coordinating program decides to proceed, it may notify the server 102 to proceed to inform the load balancer 110 that it is going to temporarily be unavailable and proceed accordingly. Alternatively, the coordinating program could directly inform the load balancer 110 that server 102 is going to be temporarily unavailable. Once the server 102 has completed garbage collection, it may notify the load balancer that it is again available to take ad requests. The coordinating program will also begin looking for the first trigger point again with respect to the server 102.

If the coordinating program decides to delay garbage collection, the trigger point program will now shift to a secondary trigger point to make additional requests. It may be as simple as waiting a set length of time before triggering its next request, for example, two minutes. If the issue is that other servers are already unavailable, the garbage collection on those other servers may only take a very short time, perhaps 50 msec, to complete. So checking back frequently may be a good solution.

The secondary trigger point may be at some set interval of fullness of the allocated memory. For instance, when an additional 1% or 5% of allocated memory is filled with garbage. Regardless of the methodology used to decide when to make additional requests, the coordinating program will continue to make attempts to schedule garbage collection for server 102 until it is finally able to do so.

Once server 102 has performed garbage collection, it will then notify the load balancer 110 that it is again available, and will resume receiving ad requests. The trigger point program will reset back to its primary trigger point for determining when to attempt to have server 102 again garbage collect.

By providing some intelligent decision making capability to control the sequence and timing of the various servers going unavailable, it should be possible to then allow longer wait intervals between garbage collection events on each server compared to the standard garbage collection times set by the operating systems on the ad request servers. These longer wait intervals will allow the servers to operate at higher efficiency, while still insuring no ad requests getting lost. Indeed, in a preferred embodiment the coordinating program will periodically do a self-analysis to work towards optimizing the first trigger points. Optimization may mean increasing the gap between garbage collection on each server, so that the servers are unavailable as little as possible. This also allows for the possibility of having two or more servers performing garbage collection at the same time.

The methodology described above with regard to server 102 would also be applied individually to servers 104, 106 and 108 as well. Using this method and apparatus, all the ad request servers in the group will be able to find time to perform garbage collection, without creating a situation where incoming ad requests will get lost or unaddressed. Further, by using an intelligent decision-making system to control the timing of the various servers garbage collecting, longer time gaps between garbage collection events can be used compared to the standard default timing of the operating systems. And the risk of having a server being unavailable at a bad time is minimized or even eliminated. And multiple servers may be able to garbage collect at the same time.

Thus, in an embodiment, a method of automatic memory management on a group of servers, the group of servers operably coupled to a coordinating program, may proceed as follows. A first server of the group of servers performs garbage collection. The coordinating program performs an analysis on the group of servers, for example analyzing the number of servers available for processing, the number of servers currently engaged in garbage collection, and a current service request load (e.g., ad request load). Based on the analysis, the coordinating program determines a feasibility of having a second server performing garbage collection during a time when the first server is performing garbage collection without degrading a service provided by the group of servers. Responsive to the coordinating program determining that the second server can perform garbage collection during the time that the first server is performing garbage collection without degrading the service provided by the group of servers, the coordinating program commands the second server to perform garbage collection when the first server is also performing garbage collection.

Figure 2:
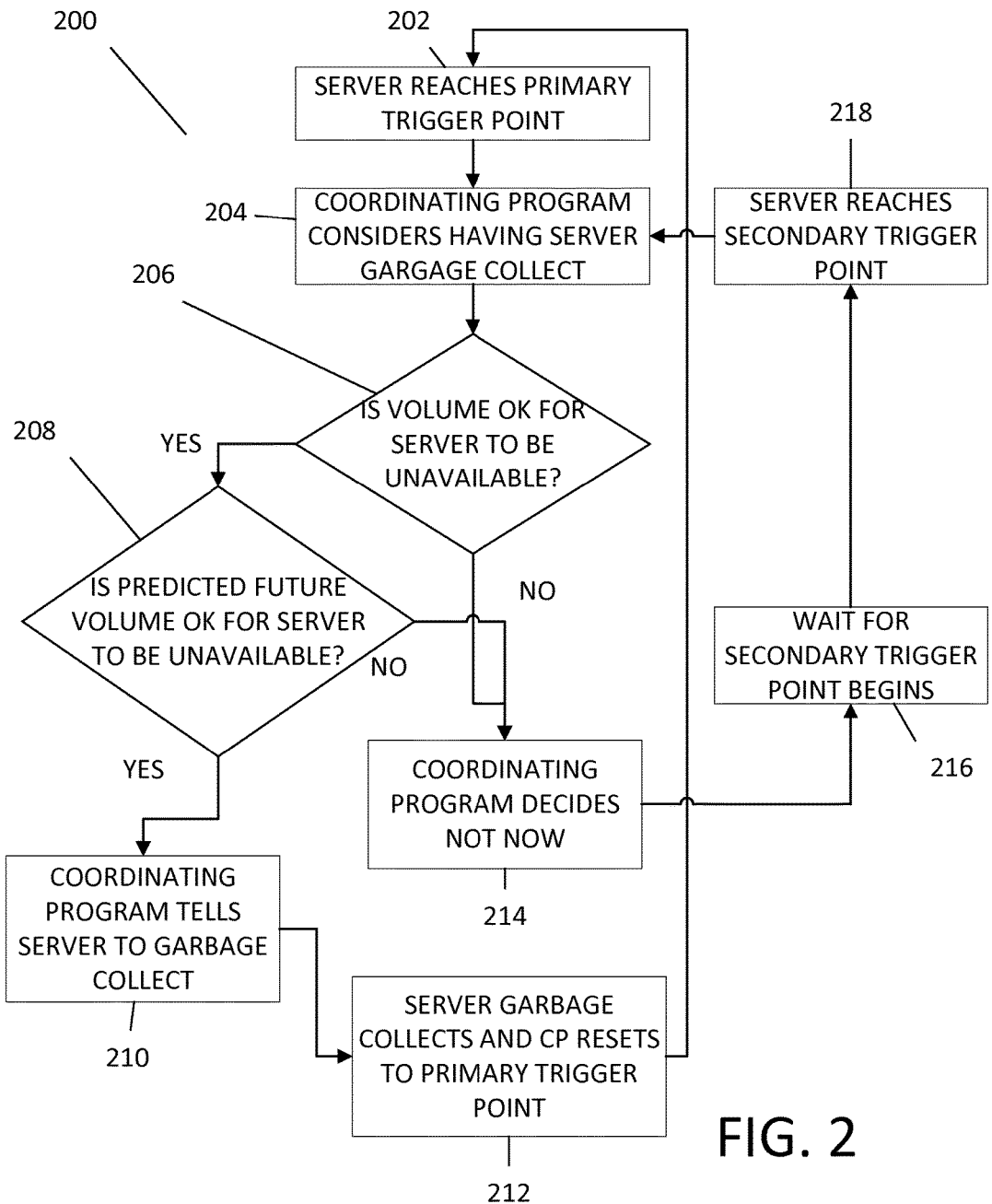
FIG. 2 is an illustration of an apparatus according to an embodiment of the disclosure.

Referring now to FIG. 2, a schematic diagram of a method 200 is shown. In a preferred embodiment, an ad request server is available to receive ad requests. A trigger point program has a primary trigger point for a server to decide when to consider garbage collection. The primary trigger point may be based on time, such as once a day, or it may preferably be tied to a percentage of allocated memory consumed by garbage. For instance, the primary trigger point may be based on having the coordinating program watching to see when the allocated memory is 50% filled with garbage. There may be a separate trigger point program running on each server, or there may be a trigger point program running as a sub-program on the coordinating program. While discussed here with respect to one server, the same methodology will apply to all the servers in the group.

Once the primary trigger point has been reached 202, the coordinating program considers 204 having the server garbage collect. The coordinating program may first ask then consider 206, are there sufficient servers remaining available to handle the current load? This enquiry will require the coordinating program to know what is the total load rate of ad requests at the moment, how many servers are still available, and how busy each of them are. For example, if there are a total of three other servers available, and the current throughput is at 80% on each server, the remaining three servers will not be able to cover the necessary load rate of ad requests while the requesting server is unavailable. But if the current throughput of each server is 70%, the other servers would be able to cover.

If the answer is that there are a sufficient number of servers to handle the volume of ad requests, then the coordinating program will preferably make a second enquiry 208 looking prospectively, is there expected to be sufficient servers left to handle the expected load while the garbage collecting server is unavailable? To answer this enquiry, the coordinating program will need some basis for predicting what the ad request volume will be through the time the requesting server is unavailable, as discussed above. This is not an inconsequential question, as the more garbage there is, the longer it takes to collect it. And one of the goals of this method is to allow the garbage to pile up more before collections, thus having less time unavailable.

If the answer to both enquiries is yes, then the requesting server is told 210 to garbage collect. The server then notifies 212 the load balancer that it is unavailable, and the load balancer shifts the requesting server's portion of the ad requests to the other servers. Once the requesting server is finished with garbage collection it again notifies the load balancer that it is again available to take ad requests. The trigger point program also resets the primary trigger point with respect to this server. The notification to the load balancer may come from the coordinating program instead.

If the answer to either enquiry above is no, then the decision is to delay 214. The trigger point program will now start looking 216 for a secondary trigger point. This sequence may be much quicker than the primary trigger point. That is, the secondary trigger point may be reached 218 in a comparatively shorter time, or percentage additional fill of allocated memory, and coordinating program will again consider garbage collection for that particular server. The trigger point program and the coordinating program will go through this same series of steps, and if it is decided again not to proceed, the trigger point program will again start looking for the secondary trigger point. Once the server has finally garbage collected, the trigger point program will go back to looking for the primary trigger point.

The step of looking at predicted future volume of ad requests could be left out. Also, the coordinating program could be part of the load balancer, or could communicate directly with the load balancer to let the load balancer know when a server is going to go unavailable. And while shown here with regard to a single server, in fact each server in the group of servers will receive the same treatment from the coordinating program. The trigger point program or programs will be tracking trigger points for each server separately. One benefit of this method is that multiple servers may garbage collect at the same time.

Figure 3:
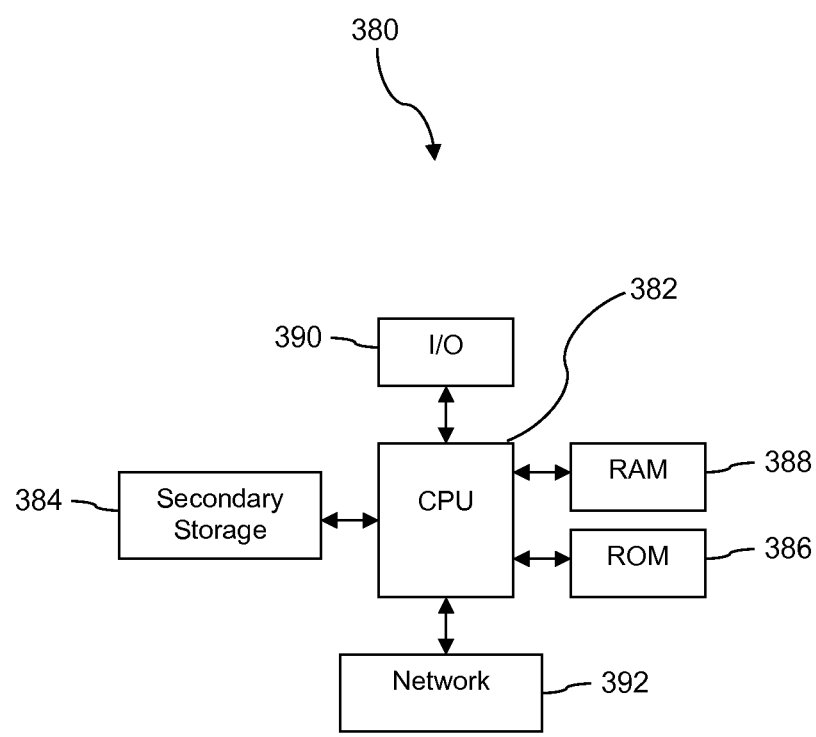
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of automatic memory management on a group of server computers, the group of server computers operably coupled to a coordinating program, the method comprising:
    performing, by a first server computer of the group of server computers, garbage collection;
    performing, by the coordinating program on a coordinating server, an analysis on the group of server computers to determine a total load of requests received across the group of server computers;
    determining, by the coordinating program, based on the total load of requests received across the group of server computers, a feasibility of having a second server computer of the group of server computers perform garbage collection during a time when the first server computers is performing garbage collection without degrading a service provided by the group of server computers; and
    responsive to the coordinating program determining that the second server computer can perform garbage collection during the time that the first server computer is performing garbage collection without degrading the service provided by the group of server computers, commanding, by the coordinating program, the second server computer to perform garbage collection when the first server computer is also performing garbage collection.

2. The method of claim 1, wherein the service provided by the group of server computers is providing advertisements for mobile communication devices.

3. The method of claim 1, further comprising:
    determining, by the coordinating program, that a third server computer can perform garbage collection during a time when the first server computer and the second server computer are also performing garbage collection; and
    performing, by the third server computer, garbage collection at a time when the first server computer and the second server computer are also performing garbage collection in response to the determination.

4. The method of claim 1, further comprising notifying, by the first server computer, a load balancer when the first server computer is going to start garbage collection.

5. The method of claim 1, wherein the coordinating program performs the analysis upon the occurrence of either a first trigger point or a second trigger point.

6. The method of claim 1, wherein the coordinating program performs the analysis after receiving a request from the second server computer to garbage collect.

7. A method of automatically deciding when to perform a memory management operation on a server computer, the server computer being one of a group of server computers, the group of server computers operably coupled to a coordinating program and a trigger point program running on either each of the server computers or as part of the coordinating program, the method comprising:
    assigning, by the trigger point program a first trigger point and a second trigger point to the server computer;
    periodically checking, by the trigger point program, the server computer to determine if the first trigger point has been reached;
    in response to a determination by the trigger point program that the first trigger point has been reached, determining, by the coordinating program on a coordinating server, whether to have the server computer perform garbage collection at that time based on a total load of requests received across the group of server computers; and
    responsive to the coordinating program determining not to have the server computer perform garbage collection at that time, periodically checking, by the trigger point program, the server computer to see if the second trigger point has been reached.

8. The method of claim 7, wherein the coordinating program determines whether to have the server computer perform garbage collection at that time based further on a current load rate of the server computer of the group of server computers.

9. The method of claim 8, further comprising reviewing, by the coordinating program, historical usage data for the group of server computers before deciding whether to have the server computer perform garbage collection.

10. The method of claim 9, wherein the historical usage data is tracked internally by the coordinating program.

11. The method of claim 9, wherein the historical usage data is a periodically updated model.

12. The method of claim 7, wherein the method is applied separately to each server computer in the group of server computers.

13. The method of claim 12, further comprising, when the second trigger point is reached and the coordinating program determines not to have the server computer perform garbage collection at that time, resetting, by the trigger point program, the second trigger point and waiting for the second trigger point to be reached again.

14. A method of automatic memory management on a group of server computers, the group of server computers operably coupled to a coordinating program, the coordinating program deciding when each server computer in the group of server computers will perform a memory management operation, the method comprising;

tracking, by the coordinating program on a coordinating server, a first trigger point on each server computer of the group of server computers;

in response to a determination by a trigger point program that the first trigger point has been reached for a server computer of the group of server computers, determining, by the coordinating program, whether to have the server computer perform garbage collection at that time based on a total load of requests received across the group of server computers; and altering, by the coordinating program, the first trigger point on each server computer, wherein the first trigger point is at least one of a predefined threshold of garbage accumulation and a predefined period of time.

15. The method of claim 14, wherein the coordinating program alters the first trigger point based at least in part on historical usage rate data for the group of server computers.

16. The method of claim 15, wherein the historical usage data is tracked internally by the coordinating program.

17. The method of claim 15, wherein the historical usage data is provided from an external source.

18. The method of claim 15, wherein the historical usage data is a periodically updated model.

19. The method of claim 14, wherein altering the first trigger point on each server computer results in longer time gaps between garbage collection on each server computer in the group of server computers.

20. The method of claim 14, further comprising:

tracking, by the coordinating program, results of using a second trigger point; and altering, by the coordinating program, the second trigger point to manage use of each server computer in the group of server computers.

\* \* \* \* \*